United States Patent
Elgersma

(10) Patent No.: US 8,104,339 B2
(45) Date of Patent: Jan. 31, 2012

(54) SYSTEMS AND METHODS FOR DETERMINING AIR DATA PARAMETERS

(75) Inventor: Michael Ray Elgersma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 899 days.

(21) Appl. No.: 12/129,263

(22) Filed: May 29, 2008

(65) Prior Publication Data

US 2009/0320586 A1   Dec. 31, 2009

Related U.S. Application Data

(60) Provisional application No. 61/030,393, filed on Feb. 21, 2008.

(51) Int. Cl.
*G01C 23/00* (2006.01)
(52) U.S. Cl. .................. 73/180; 73/170.02
(58) Field of Classification Search ............... None
See application file for complete search history.

(56) References Cited

U.S. PATENT DOCUMENTS

| | | | |
|---|---|---|---|
| 4,378,697 A * | 4/1983 | DeLeo et al. | 73/182 |
| 5,616,861 A | 4/1997 | Hagan | |
| 5,796,612 A * | 8/1998 | Palmer | 701/4 |
| 6,253,126 B1 * | 6/2001 | Palmer | 701/14 |
| 6,721,770 B1 | 4/2004 | Morton et al. | |
| 7,213,454 B2 * | 5/2007 | Schauer et al. | 73/170.02 |
| 7,257,470 B2 * | 8/2007 | Hongerholt et al. | 701/3 |
| 7,377,159 B2 * | 5/2008 | Thomas | 73/170.02 |
| 7,480,548 B2 * | 1/2009 | Shigemi et al. | 701/7 |
| 7,617,023 B2 * | 11/2009 | Seve | 701/7 |
| 2007/0220967 A1 | 9/2007 | Thomas et al. | |

* cited by examiner

*Primary Examiner* — Lisa Caputo
*Assistant Examiner* — Jermaine Jenkins
(74) *Attorney, Agent, or Firm* — Fogg & Powers LLC

(57) ABSTRACT

Systems and methods determine at least one air data parameter, such as an angle of attack (AOA), an angle of sideslip (AOS), a total pressure ($p_t$), and/or a static pressure ($p_s$), from information provided by four pressure sensors coupled to four ports on a surface of a vehicle. Each of the ports may be defined by at least a unit vector, wherein the unit vectors are oriented in different planes.

16 Claims, 3 Drawing Sheets

SYSTEMS AND METHODS FOR DETERMINING AIR DATA PARAMETERS

PRIORITY CLAIM

This patent application claims priority from copending U.S. Provisional Patent Application Ser. No. 61/030,393 filed Feb. 21, 2008, and entitled, "Systems and methods for Determining Air Data Parameters," the contents of which are hereby incorporated by reference in its entirety.

BACKGROUND OF THE INVENTION

Aircraft, missiles, and other air vehicles, manned and unmanned, utilize at least some air data parameters for flight control of the vehicle. Examples of air data parameters include, for example, static pressure (atmospheric pressure), total pressure (atmospheric pressure plus additional pressure due to airflow over the vehicle), angle of attack (the vertical angle of air velocity vector) and angle of sideslip (horizontal angle of air velocity vector).

Various pitot probes, mechanical vanes, and other protrusive devices are known to be utilized in conjunction with conventional air data systems so that the total pressure, the static pressure, the angle of attack, and the angle of sideslip can be derived by the conventional air data system. Sets of flush-mounted pressure sensors are often used near the front and sides of the vehicle to measure four air data parameters: total pressure ($p_t$), static pressure ($p_s$), angle of attack, and angle of sideslip. Flush-mounted pressure sensors have a lower radar cross section than alternate devices that measure air data parameters.

Conventional systems require at least five pressures sensed from five different ports to determine the angle of attack (AOA), the angle of sideslip (AOS), the total pressure ($p_t$), and the static pressure ($p_s$). Often, more than five pressures from more than five different ports are used. Accordingly, there is a need to more efficiently determine these air data parameters.

SUMMARY OF THE INVENTION

Embodiments determine at least one of an angle of attack (AOA), an angle of sideslip (AOS), a total pressure ($p_t$), and a static pressure ($p_s$) from information provided by four pressure sensors coupled to four ports on a surface of a vehicle. Each of the ports may be defined by at least a unit vector, wherein the unit vectors are oriented in different planes.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1:
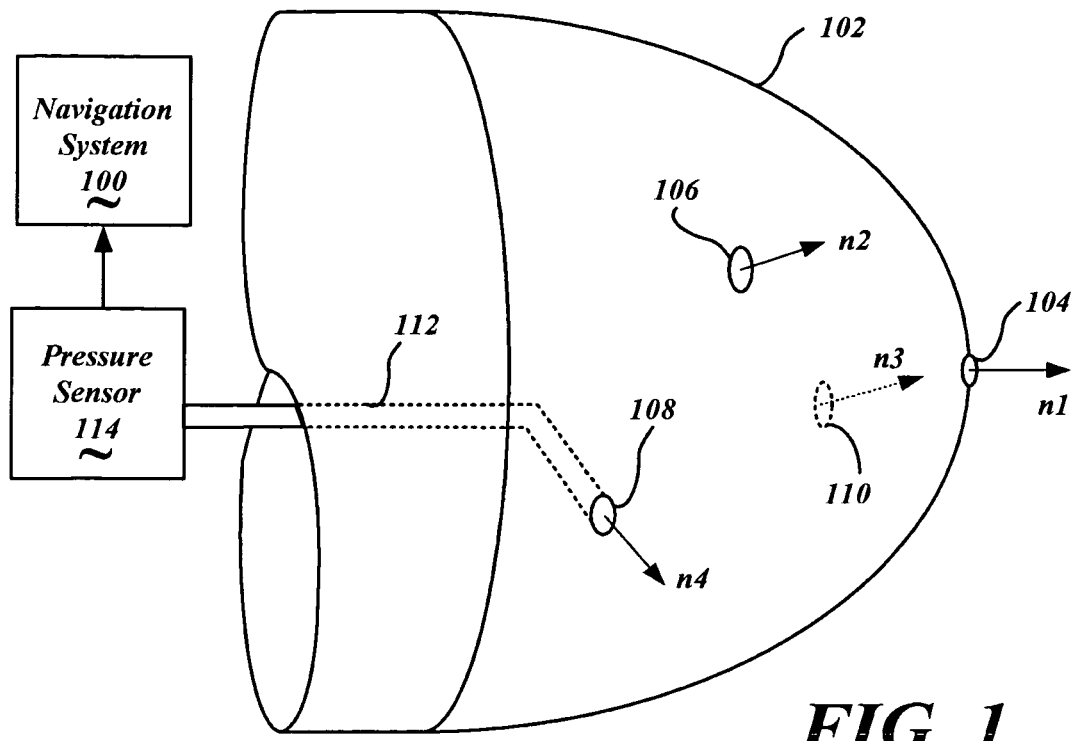
FIG. 1 is a diagram of a surface of a vehicle with four ports operable to receive an air pressure.

FIG. 1 is a diagram of a surface 102 of a vehicle, or a portion thereof, with four ports 104, 106, 108, and 110 operable to receive an air pressure used to calculate air parameters by embodiments of the navigation system 100. An angle of attack (AOA), an angle of sideslip (AOS), a total pressure ($p_t$), and a static pressure ($p_s$) are determinable from information provided by the four pressure sensors coupled to the four ports 104, 106, 108, and 110 on a surface 102 of a vehicle.

Each port 104, 106, 108, and 110 is fluidly coupled to a respective pressure sensor via a duct. For example, the port 108 is fluidly coupled to the pressure sensor 114 via duct 112. (Other ducts and pressure sensors are not illustrated for brevity.)

In one embodiment, one port 104 is located at the leading end of the surface 102. However, in other embodiments, the port 104 may be located elsewhere on the surface 102. The surface 102 may be the nose, tip, leading end or the like of the vehicle or of a special sensor device that protrudes from the vehicle. The specific locations of the four ports 104, 106, 108, and 110 is not critical, Preferably, the ports 104, 106, 108, and 110 are located anywhere near the front of the vehicle. All four ports 104, 106, 108, and 110 could even be located at the exact same place. However, the directions that the sensors are pointed in, is important. If a direction that a pressure port i is pointed in is represented by a unit vector $n_i$, then the difference of unit vectors, $n_i - n_j$, for all pairs of ports i and j, need to lie in a different plane.

Unit-length vectors ($n_i$) associated with each port are also illustrated. The unit-length vectors conceptually illustrate a vector direction in which the port is pointed, which is normal to the area of the surface 102 at the location of the port. For example, the unit-length vector "$n_1$" corresponds to the direction in which port 104 is pointed, and is extending directly outward normal from the surface 102 of the nose, tip, leading end or the like of the vehicle or protruding sensor device.

Figure 2:
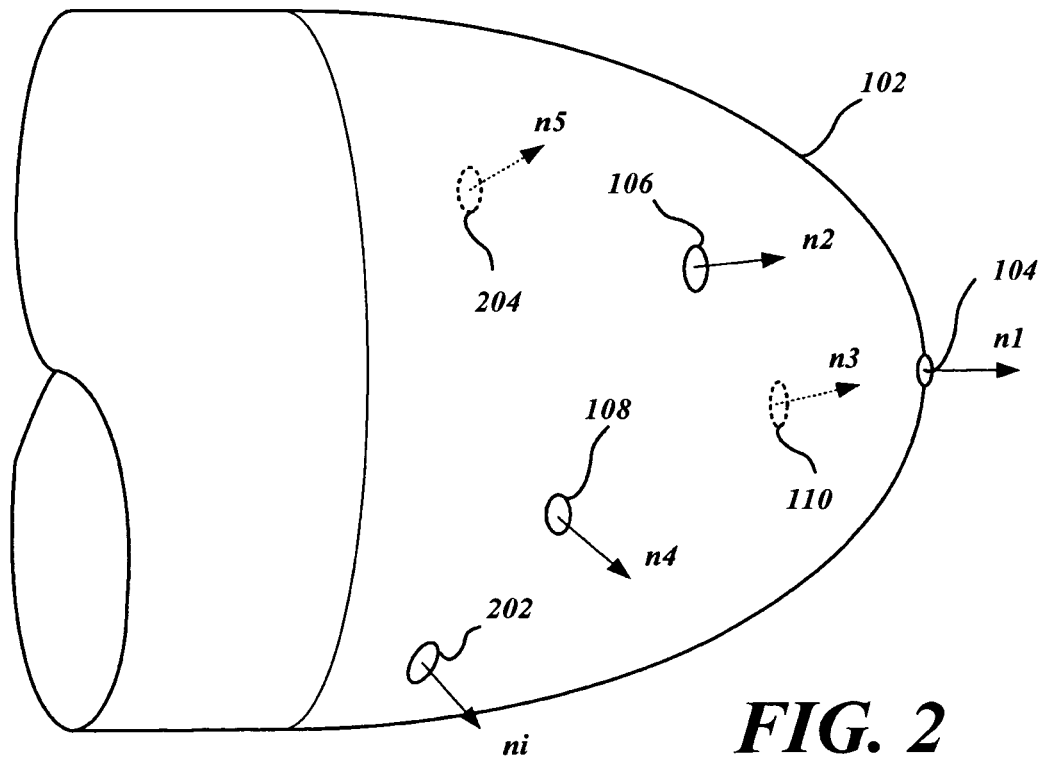
FIG. 2 is a diagram of a surface of a vehicle with six ports operable to receive an air pressure.

FIG. 2 is a diagram of a surface 102 of the vehicle with six ports 104, 106, 108, 110, 202, and 204 operable to receive air so that pressure at or near the port may be sensed. The two optional supplemental ports 202, 204 may be used to provide fault tolerance in the event of a failure of one or two of the ports 104, 106, 108, and 110. Two or more supplemental ports may be used by alternative embodiments. The process of using pressures sensed by the supplemental ports 202, 204 for fault tolerance purposes is described in greater detail below.

Figure 3:
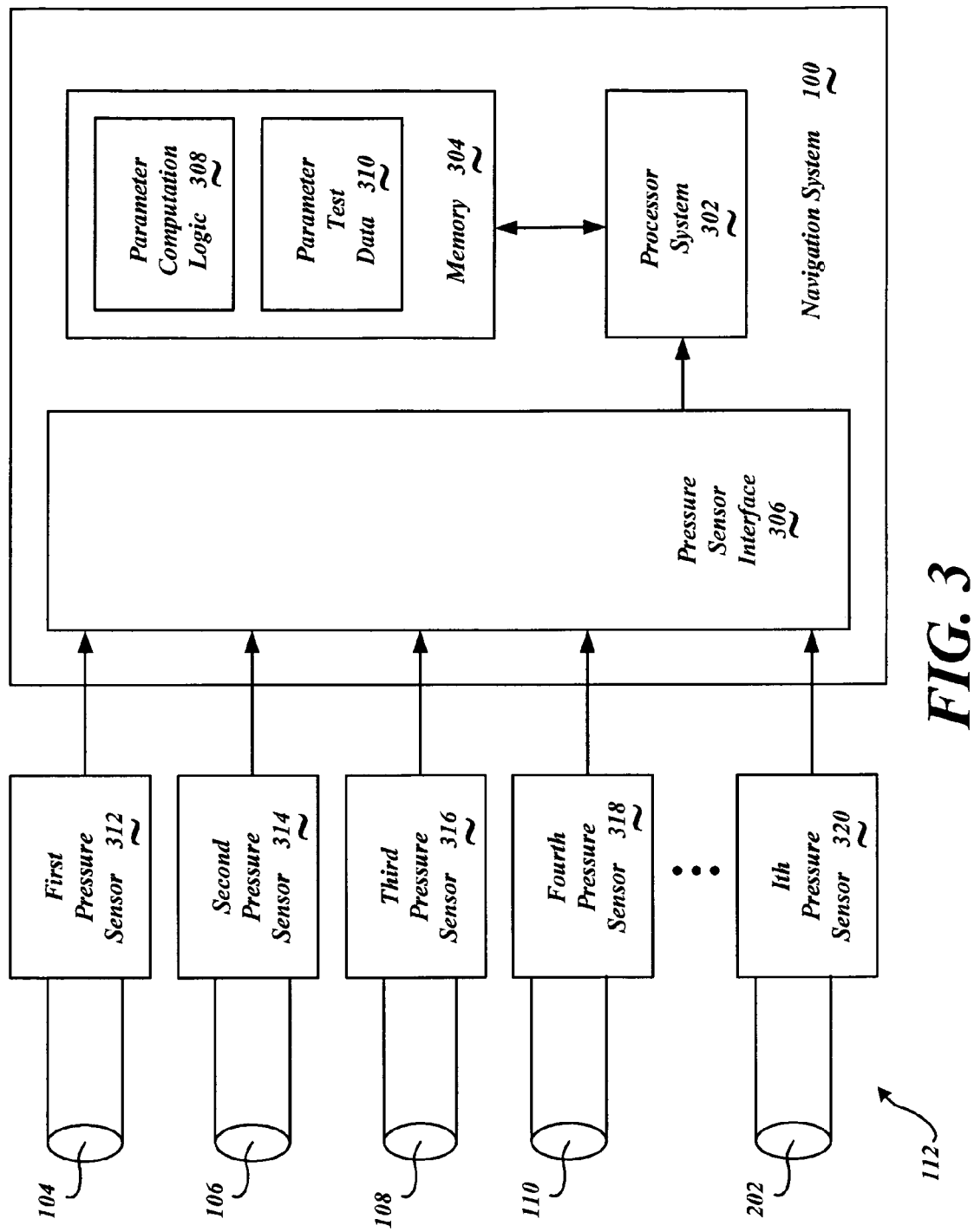
FIG. 3 is a block diagram of an embodiment of a navigation system.

FIG. 3 is a block diagram of an embodiment of the navigation system 100. The navigation system 100 has a processor system 302, a memory 304, and a pressure sensor interface 306. The memory 304 includes portions for the parameter computation logic 308 and the parameter test data 310.

A pressure sensor interface 306 is communicatively coupled to the four pressure sensors 312, 314, 316, and 318 which are fluidly coupled to the ports 104, 106, 108, and 110, respectively. If other ports are used, their respective pressure sensors also are communicatively coupled to the pressure sensor interface 306. The pressure sensor interface 306 converts signals from the pressure sensors 312, 314, 316, and 318 into pressure information that may be processed by the processor system 302.

The pressure at a port is equal to atmospheric pressure plus the component of additional pressure due to air flowing over the vehicle at the location of the port. This additional pressure component is proportional to a function of the angle between the wind velocity vector and the unit vector of the port which is normal to the surface. The processor system 302 is operable to compute the parameters using as few as four pressure sensors sensors 312, 314, 316, and 318 mounted in arbitrary locations on the front surface 202 of a vehicle.

Below follows the equations that are derived for the case where the sensors 312, 314, 316, and 318 are sensing an undisturbed flow on the surface 202. For example, an undisturbed flow may occur at or near the tip of a nose of a vehicle travelling at supersonic speed.

The total pressure ($p_t$), the static pressure ($p_s$), the angle of attack (AOA), and the angle of sideslip (AOS), are parameters to be calculated by the processor system 302, which receives information corresponding to the sensed pressures at the ports: $p_1, p_2, p_3, p_4, \ldots$.

Let v be the vehicle's velocity vector in body coordinates. Let m be the number of pressure ports on the vehicle's surface, with a port i having a pressure $p_i$ and arbitrary surface unit-normal vector $n_i$. Let $n'_i$ be the transpose of the $n_i$ vector. The cosine of the angle between the velocity vector and the normal vector at the surface is given by $n'_i * v/\|v\|$. The pressure measured at the port i is then given by equation (1):

$$p_i = p_s + (p_t - p_s) * n'_i * v/\|v\| \quad i=1 \text{ to } m \qquad \text{Eq}(1)$$

The processor system 302 uses $m \geq 4$ pressure-measurement equations to compute air data parameters $[p_s, p_t, v/\|v\|]$ which can also be expressed in terms of $[p_s, p_t, \text{AOA}, \text{AOS}]$ since putting unit vector, $v/\|v\|$, into spherical coordinates gives angles AOA and AOS. This measurement equation is exact only for an undisturbed flow of a fluid, such as air, over surface 202 (e.g., at the tip of an aircraft or missile nose-cone) that occurs, for example, in a supersonic flow over the surface as the vehicle is travelling at supersonic speeds. Let $w_i$ be the augmented normal vector, shown below in equation (2).

$$w_i = \begin{bmatrix} 1 \\ n_i \end{bmatrix} \in R^4 \qquad \text{Eq (2)}$$

Let u be the unknown vector, shown below in equation (3).

$$u = \begin{bmatrix} p_s \\ (p_t - p_s) \dfrac{v}{\|v\|} \end{bmatrix} \in R^4 \qquad \text{Eq (3)}$$

Here, the term "$\|v\|$" is the length of the vector v. The term "$R^4$" indicates that u is a vector with four rows.

Let the transformation between angles (AOA, AOS) and the unit vector $v/\|v\|$ be defined by equation (4) below:

$$\begin{bmatrix} \cos(AOA) * \cos(AOS) \\ \sin(AOS) \\ \sin(AOA) * \cos(AOS) \end{bmatrix} = \dfrac{v}{\|v\|} \in R^3 \qquad \text{Eq (4)}$$

Here, the terms cos(AOA), cos(AOS), sin(AOA), and sin(AOS) form the components of the unit vector $v/\|v\|$ expressed in polar coordinates.

Then the m pressure equations from equation (1) can be written as shown in equation (5) below.

$$p_i = w'_i * u \quad i=1 \text{ to } m \qquad \text{Eq}(5)$$

Here, $w'_i$ corresponds to a vector transposition of vector $w_i$.

Multiplying the above equation by vector $w_i$ and summing over i gives:

$$\left[ \sum_{i=1}^{m} w_i * p_i \right] = \left[ \sum_{i=1}^{m} w_i * w'_i \right] * u \qquad \text{Eq (6)}$$

The constant 4×4 matrix $$\left[ \sum_{i=1}^{m} w_i * w'_i \right]$$

is invertible for $m \geq 4$ pressure ports if and only if all differences of unit vectors, $n_i - n_j$, do not lie in the same plane (see below for a demonstrating proof). Solving this system of four linear equations for unknown vector u is shown in equation (7) below.

$$u = \left[ \sum_{i=1}^{m} w_i * w'_i \right]^{-1} * \left[ \sum_{i=1}^{m} w_i * p_i \right] \qquad \text{Eq (7)}$$

Then the values of $[p_s, p_t, v/\|v\|]$ can be extracted from the vector u. The top row of equation (3) gives:

$$p_s = u(1) \qquad \text{Eq}(8)$$

The bottom three rows of equation (3) give:

$$p_t - p_s = \left\| \begin{matrix} u(2) \\ u(3) \\ u(4) \end{matrix} \right\| \text{ so } p_t = \left\| \begin{matrix} u(2) \\ u(3) \\ u(4) \end{matrix} \right\| + p_s \qquad \text{Eq (9)}$$

A velocity unit vector $v_{unit} = v/\|v\|$ is then defined. Using the values for $p_t - p_s$ from equation (9) in the bottom three rows of equation (3) gives:

$$v_{unit} = v/\|v\| = \begin{bmatrix} u(2) \\ u(3) \\ u(4) \end{bmatrix} \bigg/ (p_t - p_s) \qquad \text{Eq (10)}$$

Using the middle value of $v_{unit} = v/\|v\|$ from equation (10), in equation (4), and taking inverse sine (asine) gives equation (11) below.

$$AOS = a\sin(v_{unit}(2)) \qquad \text{Eq}(11)$$

Using the ratio of the third and first value of $v_{unit} = v/\|v\|$ from equation (10), in equation (4), and taking inverse tangent gives equation (12) below.

$$AOA = a\tan 2(v_{unit}(3), v_{unit}(1)) \qquad \text{Eq}(12)$$

More general equations apply to both subsonic and supersonic flight. For the more general case where the pressure ports 104, 106, 108, and 110 are in a disturbed flow of fluid over the surface 102 (such as at supersonic speeds), the above equations are not exact. Accordingly, the equations are modified using experimental data. The experimental data may be empirical test data or computed data based on models or the like.

Let a pressure vector, P, contain pressures from all m ports, as shown by equation (13) below.

$$P = \begin{bmatrix} p_1 \\ p_2 \\ \vdots \\ p_m \end{bmatrix} \quad \text{Eq (13)}$$

Let 4×m augmented unit normal matrix, W, contain all augmented normal vectors, $w_i$, as shown in equation (14).

$$W = [w_1 w_2 \ldots w_m] \epsilon R^{4 \times m} \quad \text{Eq(14)}$$

Let 4×m undisturbed flow matrix, $A_{undisturbed\_flow}$, be defined by equation (15).

$$A_{undisturbed\_flow} = (W^*W')^{-1} * W \epsilon R^{4 \times m} \quad \text{Eq(15)}$$

Then, for pressure sensors in undisturbed flow, equation (7), $$u = \left[ \sum_{i=1}^{m} w_i * w_i' \right]^{-1} * \left[ \sum_{i=1}^{m} w_i * p_i \right],$$

can be written using the constant matrix $A_{undisturbed\_flow}$ as shown in equation (16) below.

$$u = A_{undisturbed\_flow} * P \quad \text{Eq(16)}$$

For pressure sensors in disturbed flow, which occurs for most vehicle shapes at supersonic speeds, and all vehicle shapes at speeds that are not supersonic, the following more general form of the equations for computing AOA, AOS, $p_t$, and $p_s$ applies. The general flow matrix, A, is a function of AOA, AOS and M=(vehicle speed)/(speed of sound), as shown in equation (17).

$$u = A(AOA, AOS, M) * P \quad \text{Eq(17)}$$

The 4×m matrix function A(AOA, AOS, M) is determined by least-squares fit to experimental data. First the parameter space, (AOA, AOS, M) is divided into many sub-regions, then in each sub-region a least-squares fit is done to find the best constant A matrix for that sub-region. For example, the least squares fit can be done at the 13*13*11=1859 regions centered at:

AOA(i) in the set [−30, −25, −20, −15, −10, −5, 0, 5, 10, 15, 20, 25, 30] degrees i=1 to 13

AOS(j) in the set [−30, −25, −20, −15, −10, −5, 0, 5, 10, 15, 20, 25, 30] degrees, j=1 to 13

M(k) in the set [0.1, 0.6, 0.7, 0.8, 0.9, 1.0, 1.1, 1.2, 1.3, 1.4, 2.0] k=1 to 11.

For M(k)>1, the smaller AOA and AOS values of [−5, 0, 5] degrees may be used.

The resulting 1859 A(AOA(i), AOS(j), M(k)) matrix values are stored in the parameter test data 310 portion of memory 304.

A single composite matrix, $A_{nominal}$, is fit to the entire region for a crude initial computation, as shown in equation (17).

$$u_{crude} = A_{nominal} * P \quad \text{Eq(18)}$$

Using the crude value of u from equation (18), equations (8), (9), (10), (11), and (12) give crude initial estimates for AOA, AOS and M, where M is a function of $(p_t - p_s)$ and air temperature. These crude estimates of AOA, AOS and M are then used to determine which stored A(AOA(i), AOS(j), M(k)) matrix to use to compute a more accurate value of u using equation (19) below.

$$U_{accurate} = A(AOA(i), AOS(j), M(k)) * P \quad \text{Eq(19)}$$

Using the accurate value of u from equation (19) in equations (8), (9), (10), (11), and (12) gives accurate values for AOA, AOS, $p_t$, and $p_s$.

As noted above, the values of AOA, AOS, $p_t$, and $p_s$ are determinable from pressures received from the four ports 104, 106, 108, and 110. However, if one of the ports 104, 106, 108, and 110 becomes inoperable, such as clogging by foreign matter or a failure in the pressure sensor electronics, then the AOA, AOS, $p_t$, and $p_s$ are no longer determinable.

Accordingly, one or more supplemental or extra ports are provided, such as the exemplary ports 202, 204. For example, if at least six pressure ports 104, 106, 108, 110, 202, and 204 are available, and in view that pressure information from only four ports is required, the processor system 302 can compute solutions using all fifteen combinations of the six ports 104, 106, 108, 110, 202, and 204 taken four at a time. That is, the processor system 302 computes fifteen sets of AOA, AOS, $p_t$, and $p_s$ based on the fifteen sets of ports.

Accordingly, with a single inoperable port and/or sensor, five of the fifteen computed sets of AOA, AOS, $p_t$, and $p_s$ will be accurate. Those five accurate solutions will agree with each other. That is, the five agreeing sets of AOA, AOS, $p_t$, and $p_s$ are then known to be accurate.

If n supplemental ports and sensors are used, and i ports and/or sensors are inoperable, then for all good combinations of (4+n−i) good sensors, taken 4 at a time, the computed sets of AOA, AOS, $p_t$, and $p_s$ will be accurate. Preferably, there will be two or more supplemental sensors. When there is only one supplemental sensor, n=1, and one sensor becomes inoperable, there is only one combination of four good sensors remaining that provides accurate values for AOA, AOS, $p_t$, and $p_s$. Since there are no other sets of operable sensors to compare to, AOA, AOS, $p_t$, and $p_s$, it will not have sufficient information to determine which set of four sensors is operational. That is, there is no independent way of knowing which set of four sensors is correct (since there is only one set). Therefore, at least two supplemental sensors are required in order to determine the correct answer when one sensor fails.

Furthermore, by noting which sets of AOA, AOS, $p_t$, and $p_s$ are inaccurate (do not agree with the five accurate sets of AOA, AOS, $p_t$, and $p_s$) the port and/or sensor that is not included in the set of five accurate solutions can be identified. Thus, a fault tolerant system for determining AOA, AOS, $p_t$, and $p_s$ is available in embodiments of the navigation system 100 that includes at least six ports and sensors.

As noted above, the constant 4×4 matrix $$\left[ \sum_{i=1}^{m} w_i * w_i' \right]$$

is invertible for m≧4 pressure ports if and only if all differences of unit vectors, $n_i - n_j$, do not lie in the same plane. Below follows a demonstrating proof.

The following theorem is tested by the proof below:
The 4×4 matrix $$\left[ \sum_{i=1}^{m} w_i * w_i' \right]$$

is invertible (rank=4) if and only if m≧4 and all differences of unit normals, $n_i - n_j$, do not lie in the same plane in $R^3$.

The proof of the above theorem is as follows. Define 4×m matrix in accordance with equation (20) below.

$$W = [w_1 \ w_2 \ \ldots \ w_m] = \begin{bmatrix} 1 & 1 & 1 & \ldots & 1 \\ n_1 & n_2 & n_3 & \ldots & n_m \end{bmatrix} \quad \text{Eq (20)}$$

Then define a m×4 matrix W'=transpose (W). Then, $$\left[\sum_{i=1}^{m} w_i * w_i'\right] = W * W'$$

is invertible if and only if rank(W)=4.

Next, let $I_3$ be a 3×3 identity matrix, so that 4×4 matrix $$\begin{bmatrix} 1 & [0, 0, 0] \\ -n_j & I_3 \end{bmatrix}$$

is full rank. Equation (21) below then defines rank(W).

$$\begin{aligned}
\text{rank}(W) &= \text{rank}\left(\begin{bmatrix} 1 & [0,0,0] \\ -n_j & I_3 \end{bmatrix} * W\right) \\
&= \text{rank}\left(\begin{bmatrix} 1 & [0,0,0] \\ -n_j & I_3 \end{bmatrix} * \begin{bmatrix} 1 & 1 & 1 & \ldots & 1 \\ n_1 & n_2 & n_3 & \ldots & n_m \end{bmatrix}\right) \\
&= \text{rank}\left(\begin{bmatrix} 1 & \ldots & 1 & 1 & 1 & \ldots & 1 \\ n_1-n_j & \ldots & n_{j-1}n_j & 0 & n_{j+1}-n_j & \ldots & n_m-n_j \end{bmatrix}\right) \\
&= 1 + \text{rank}([\, n_1-n_j \ \ n_2-n_j \ \ \ldots \ \ n_m-n_j \,]) \\
&= 1 + 3 \text{ if and only if } m \geq 4 \text{ and all } n_j-n_j \text{ do not lie} \\
&\quad \text{in the same plane in } R^3 1 \leq i \leq m \ \ 1 \leq j \leq m.
\end{aligned} \quad \text{Eq (21)}$$

An example demonstrating a process for receiving air pressure information and calculating air parameters by an exemplary embodiment of the navigation system 100 is now provided. Assume a vehicle whose nose surface is a cone. Its conical surface is defined with angle $\xi$ from the symmetry axis of the cone to the surface of the cone (e.g.; $\sin(\xi) \approx 1/M_{max}$ for typical hypersonic vehicles with max Mach number $M_{max}$). Also assume that the surface has four pressure ports, $p_1 = p_{front}$ at the point of the cone (in the x direction), and three more $p_2 = p_{right}$, $p_3 = p_{bottom}$, $p_4 = p_{left}$, distributed around a circle further back on the cone. The four normal vectors, $n_i$, i=1, 2, 3, 4 will be:

$$[n_1 \ n_2 \ n_3 \ n_4] = \begin{bmatrix} 1 & \sin(\xi) & \sin(\xi) & \sin(\xi) \\ 0 & \cos(\xi) & 0 & -\cos(\xi) \\ 0 & 0 & \cos(\xi) & 0 \end{bmatrix}. \quad \text{Eq (22)}$$

Using Equation (22) then gives:

$$[w_1 \ w_2 \ w_3 \ w_4] = \begin{bmatrix} 1 & 1 & 1 & 1 \\ 1 & \sin(\xi) & \sin(\xi) & \sin(\xi) \\ 0 & \cos(\xi) & 0 & -\cos(\xi) \\ 0 & 0 & \cos(\xi) & 0 \end{bmatrix}. \quad \text{Eq (23)}$$

Applying equation (23) to the four pressure ports (m=4) gives:

$$u = \left[\sum_{i=1}^{4} w_i * w_i'\right]^{-1} * \left[\sum_{i=1}^{4} w_i * p_i\right] \quad \text{Eq (24)}$$

$$= \begin{bmatrix} \frac{-\sin(\xi)}{[1-\sin(\xi)]} & \frac{1}{2*[1-\sin(\xi)]} & 0 & \frac{1}{2*[1-\sin(\xi)]} \\ \frac{1}{[1-\sin(\xi)]} & \frac{-1}{2*[1-\sin(\xi)]} & 0 & \frac{-1}{2*[1-\sin(\xi)]} \\ 0 & \frac{1}{2*\cos(\xi)} & 0 & \frac{-1}{2*\cos(\xi)} \\ 0 & \frac{-1}{2*\cos(\xi)} & \frac{1}{\cos(\xi)} & \frac{-1}{2*\cos(\xi)} \end{bmatrix} *$$

$$\begin{bmatrix} p_{front} \\ p_{right} \\ p_{bottom} \\ p_{left} \end{bmatrix}.$$

Using equations (2) and (4) for the definition of elements of u, in equation (24) then gives equations (25)-(28) for $p_s$, $p_t$, AOA and AOS:

$$p_s = [-p_{front}*\sin(\xi) + (p_{right}+p_{left})/2]/(1-\sin(\xi)), \quad \text{Eq(25)}$$

$$(p_t-p_s)*\cos(AOA)*\cos(AOS) = [p_{front}-(p_{right}+p_{left})/2]/(1-\sin(\xi)), \quad \text{Eq(26)}$$

$$(p_t-p_s)*\sin(AOS) = (p_{right}-p_{left})/(2*\cos(\xi)), \text{ and} \quad \text{Eq(27)}$$

$$(p_t-p_s)*\sin(AOA)*\cos(AOS) = [p_{bottom}-(p_{right}+p_{left})/2]/\cos(\xi). \quad \text{Eq(28)}$$

Taking the norm of the vector formed by the three equations (26)-(28) gives ($p_t-p_s$), which combined with equation (25) for $p_s$ gives total pressure $p_t$:

$$p_t = \left\| \begin{matrix} [p_{front} - (p_{right}+p_{left})/2]/(1-\sin(\xi)) \\ (p_{right}-p_{left})/(2*\cos(\xi)) \\ [p_{bottom}-(p_{right}+p_{left})/2]/\cos(\xi) \end{matrix} \right\| - p_s. \quad \text{Eq (29)}$$

Equation (27) then gives AOS:

$$\sin(AOS) = [(p_{right}-p_{left})/(2*\cos(\xi)*(p_t-p_s))] \quad \text{Eq(30)}$$

Dividing equation (28) by equation (26) gives AOA:

$$\tan(AOA) = [[p_{bottom}-(p_{right}+p_{left})/2]/[p_{front}-(p_{right}+p_{left})/2]*[(1-\sin(\xi))/\cos(\xi)] \quad \text{Eq(31)}$$

Solution of the above equations enables determination of the above identified air parameters.

Figure 4:
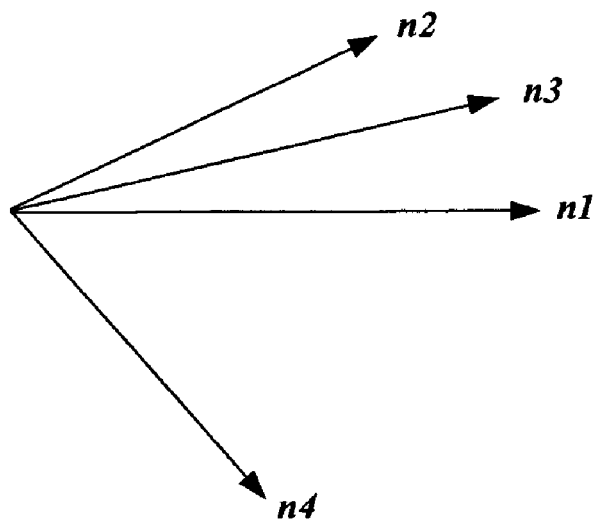
FIG. 4 illustrates the unit vectors of FIG. 1 at an origin.
Figure 5:
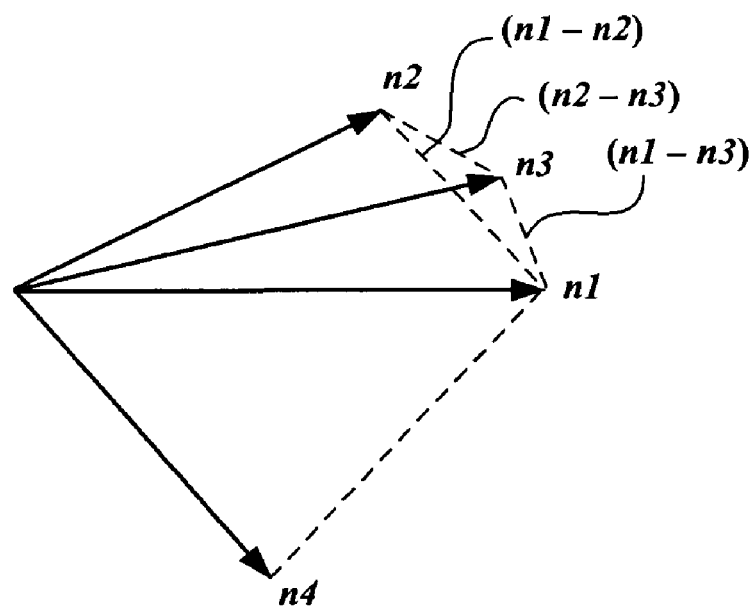
FIG. 5 illustrates that differences of unit vector pairs do not lie in the same plane.

FIG. 4 illustrates the unit vectors of FIG. 1 at an origin. FIG. 5 illustrates that differences of unit vector pairs do not lie in the same plane. For the four unit vectors n1, n2, n3, and n4, the set of $n_i - n_j$ vectors do not all lie in the same plane. That is, each of the unit vector pairs define a unit vector difference (ni−nj). In the various embodiments, at least one of the vector pair differences lies in a different plane than the other unit vector pair differences.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method that determines air data parameters for a vehicle, comprising:
   receiving a first air pressure from a first port located on a surface of the vehicle;
   receiving a second air pressure from a second port located on the surface of the vehicle;
   receiving a third air pressure from a third port located on the surface of the vehicle;
   receiving a fourth air pressure from a fourth port located on the surface of the vehicle;
   determining at least one of a total pressure ($p_t$), a static pressure ($p_s$), an angle of attack (AOA), and an angle of sideslip (AOS) from the first air pressure, the second air pressure, the third air pressure, and the fourth air pressure;
   comparing the at least one of the determined $p_t$, the $p_s$, the AOA, and the AOS for each of the identified groupings of four different air pressures;
   identifying the groupings of four different air pressures that have the same at least one of the determined $p_t$, $p_s$, AOA, and AOS; and
   determining at least one of an actual $p_t$, an actual $p_s$, an actual AOA, and an actual AOS based upon the at least one determined $p_t$, $p_s$, AOA, and AOS for each of the identified groupings of four different air pressures that have the same at least one of the $p_t$, $p_s$, AOA, and AOS.

2. The method of claim 1, wherein each of the ports is defined by at least a unit vector, wherein each pair of the unit vectors defines a difference, and wherein at least one of the vector pair differences lies in a different plane than the other unit vector pair differences.

3. The method of claim 1, further comprising:
   receiving a fifth air pressure from a fifth port located on the surface of the vehicle;
   receiving a sixth air pressure from a sixth port located on the surface of the vehicle;
   identifying a plurality of groupings of four different air pressures from the first, second, third, fourth, fifth and sixth air pressures; and
   determining at least one of a $p_t$, a $p_s$, an AOA, and an AOS for each of the identified groupings of four different air pressures.

4. The method of claim 3, wherein each of the ports is defined by at least a unit vector, wherein each pair of the unit vectors defines a difference, and wherein at least one of the vector pair differences lies in a different plane than the other unit vector pair differences.

5. The method of claim 1, further comprising:
   identifying the groupings of four different air pressures that have at least one different $p_t$, $p_s$, AOA, and AOS;
   identifying at least one port commonly associated with the groupings of four different air pressures that have the at least one different $p_t$, $p_s$, AOA, and AOS; and
   determining that the identified at least one port is inoperable.

6. The method of claim 1, further comprising:
   receiving test data; and
   adjusting at least one of the determined $p_t$, $p_s$, AOA, and AOS based on the received test data.

7. The method of claim 6, wherein the receiving and the adjusting occurs in response to the vehicle travelling at a speed less than the speed of sound.

8. The method of claim 1, wherein the first, the second, the third and the fourth pressures are received while the vehicle is moving at a supersonic speed.

9. A system for determining air data parameters for a vehicle, comprising:
   a first sensor coupled to a first port located on a surface of the vehicle, and operable to sense a first air pressure;
   a second sensor coupled to a second port located on the surface of the vehicle, and operable to sense a second air pressure;
   a third sensor coupled to a third port located on the surface of the vehicle, and operable to sense a third air pressure;
   a fourth sensor coupled to a fourth port located on the surface of the vehicle, and operable to sense a fourth air pressure; and
   a processor system operable to determine at least one of a total pressure ($p_t$), a static pressure ($p_s$), an angle of attack (AOA), and an angle of sideslip (AOS) from the first air pressure, the second air pressure, the third air pressure, and the fourth air pressure;
   wherein each of the ports is defined by at least a unit vector, wherein each pair of the unit vectors defines a difference, and wherein at least one of the unit vector pair differences lies in a different plane than the other unit vector pair differences.

10. The system of claim 9, further comprising:
    a fifth sensor coupled to a fifth port located on the surface of the vehicle, and operable to sense a fifth air pressure; and
    a sixth sensor coupled to a sixth port located on the surface of the vehicle, and operable to sense a sixth air pressure,
    wherein the processor system is operable to:
       identify a plurality of groupings of four different air pressures from the first, second, third, fourth, fifth and sixth air pressures; and
       determine at least one of a $p_t$, a $p_s$, an AOA, and an AOS for each of the identified groupings of four different air pressures.

11. The system of claim 10, wherein the processor system is operable to:
    compare at least one of the determined $p_t$, the $p_s$, the AOA, and the AOS for each of the identified groupings of four different air pressures;
    identify the groupings of four different air pressures that have the same at least one of the determined $p_t$, $p_s$, AOA, and AOS; and
    determine at least one of an actual $p_t$, an actual $p_s$, an actual AOA, and an actual AOS from the determined $p_t$, $p_s$, AOA, and AOS for each of the identified groupings of four different air pressures that have the same at least one of $p_t$, $p_s$, AOA, and AOS.

12. The system of claim 10, wherein the processor system is operable to:
    compare at least one of the determined $p_t$, the $p_s$, the AOA, and the AOS for each of the identified groupings of four different air pressures;
    identify the groupings of four different air pressures that have at least one different $p_t$, $p_s$, AOA, and AOS;

identify at least one port commonly associated with the groupings of four different air pressures that have the at least one different $p_t$, $p_s$, AOA, and AOS; and determine that the identified at least one port is inoperable.

13. The system of claim 10, wherein each of the ports is defined by at least a unit vector, wherein each pair of the unit vectors defines a difference, and wherein at least one of the vector pair differences lies in a different plane than the other unit vector pair differences.

14. A system that determines air data parameters, comprising:
- means for sensing a first air pressure at a first location on a surface of the vehicle;
- means for sensing a second air pressure at a second location on the surface of the vehicle;
- means for sensing a third air pressure at a third location on the surface of the vehicle;
- means for sensing a fourth air pressure at a fourth location on the surface of the vehicle; and
- means for determining at least one of a total pressure ($p_t$), a static pressure ($p_s$), an angle of attack (AOA), and an angle of sideslip (AOS) from the first air pressure, the second air pressure, the third air pressure, and the fourth air pressure, wherein the means for determining is operable to:
    - compare at least one of the determined $p_t$, the $p_s$, the AOA, and the AOS for each of the identified groupings of four different air pressures;
    - identify the groupings of four different air pressures that have the same at least one of the determined $p_t$, $p_s$, AOA, and AOS; and
    - determine at least one of an actual $p_t$, an actual $p_s$, an actual AOA, and an actual AOS from the determined $p_t$, $p_s$, AOA, and AOS for each of the identified groupings of four different air pressures that have the same at least one of $p_t$, $p_s$, AOA, and AOS.

15. The system of claim 14, wherein each of the locations is defined by at least a unit vector, and wherein a difference in each of the unit vector pairs lie in different planes.

16. The system of claim 14, wherein the means for determining is further operable to:
- identify the groupings of four different air pressures that have at least one different $p_t$, $p_s$, AOA, and AOS;
- identify at least one port commonly associated with the groupings of four different air pressures that have the at least one different $p_t$, $p_s$, AOA, and AOS; and
- determine that the identified at least one port is inoperable.

* * * * *